(12) United States Patent
Rosenbeck (10) Patent No.: US 10,940,634 B2
(45) Date of Patent: Mar. 9, 2021

(54) BLOW MOLDING APPARATUS AND SYSTEM

(71) Applicant: UNILOY, INC., Tecumseh, MI (US)

(72) Inventor: John Scott Rosenbeck, Jackson, MI (US)

(73) Assignee: UNILOY, INC., Tecumseh, MI (US)

( * ) Notice: Subject to any disclaimer, the term of this patent is extended or adjusted under 35 U.S.C. 154(b) by 0 days.

(21) Appl. No.: 16/594,573

(22) Filed: Oct. 7, 2019

(65) Prior Publication Data

US 2020/0108543 A1 Apr. 9, 2020

Related U.S. Application Data

(60) Provisional application No. 62/741,844, filed on Oct. 5, 2018.

(51) Int. Cl.
*B29C 49/56* (2006.01)
*B29C 49/04* (2006.01)
*B29C 49/28* (2006.01)

(52) U.S. Cl.
CPC .............. *B29C 49/56* (2013.01); *B29C 49/04* (2013.01); *B29C 49/28* (2013.01); *B29C 2049/563* (2013.01)

(58) Field of Classification Search
CPC .............. B29C 49/56; B29C 2049/563; B29C 2049/048; B29C 49/04
See application file for complete search history.

(56) References Cited

U.S. PATENT DOCUMENTS

| | | | | |
|---|---|---|---|---|
| 3,480,993 A | * | 12/1969 | Schjeldahl et al. | B29C 49/06 425/156 |
| 3,880,565 A | * | 4/1975 | Barr | B29C 33/22 425/150 |
| 3,883,286 A | | 5/1975 | Kinslow, Jr. | |
| 4,432,720 A | * | 2/1984 | Wiatt | B29C 49/28 425/534 |
| 4,457,689 A | | 7/1984 | Aoki | |
| 4,747,769 A | | 5/1988 | Nakamura | |
| 4,859,170 A | * | 8/1989 | Aoki | B29C 33/202 425/450.1 |
| 5,486,103 A | * | 1/1996 | Meiring | B29C 33/202 425/541 |
| 5,705,121 A | | 1/1998 | Allred, Jr. | |
| 5,976,452 A | * | 11/1999 | Meyer | B29C 49/56 264/542 |
| 6,514,452 B1 | | 2/2003 | Maier | |
| 2010/0278960 A1 | * | 11/2010 | Vassar | B29C 49/56 425/538 |

OTHER PUBLICATIONS

International (PCT) Search Report and Written Opinion for PCT/US2019/0545972, dated Dec. 18, 2019, UN-120 PCT II, 6 pages.

* cited by examiner

*Primary Examiner* — Robert B Davis
(74) *Attorney, Agent, or Firm* — Barnes & Thornburg LLP (57) ABSTRACT

A blow mold clamping apparatus and a blow molding system are disclosed.

20 Claims, 8 Drawing Sheets

BLOW MOLDING APPARATUS AND SYSTEM

CROSS-REFERENCE TO RELATED APPLICATION

The present application claims the benefit of prior U.S. Appl. No. 62/741,844, filed Oct. 5, 2018, the contents of which are incorporated by reference herein in its entirety.

TECHNICAL FIELD

The present invention relates to blow molding, and more particularly to a blow molding system and blow mold clamping apparatus.

SUMMARY

Embodiments hereof are directed to a blow mold clamping apparatus.

Embodiments hereof are directed towards a blow molding system having a blow mold clamping apparatus.

BRIEF DESCRIPTION OF DRAWINGS

The foregoing and other features and advantages of the present disclosure will be apparent from the following description of embodiments thereof as illustrated in the accompanying drawings. The accompanying drawings, which are incorporated herein and form a part of the specification, further serve to explain the principles of the present disclosure and to enable a person skilled in the pertinent art to make and use the invention(s) taught in the present disclosure. The drawings may not be to scale.

DETAILED DESCRIPTION

Specific embodiments of the present disclosure are now described with reference to the figures. The following detailed description is merely exemplary in nature and is not intended to limit the disclosure or the application and uses of the disclosure. Furthermore, there is no intention to be bound by any expressed or implied theory presented in the preceding technical field, background, summary or the following detailed description.

Figure 1:
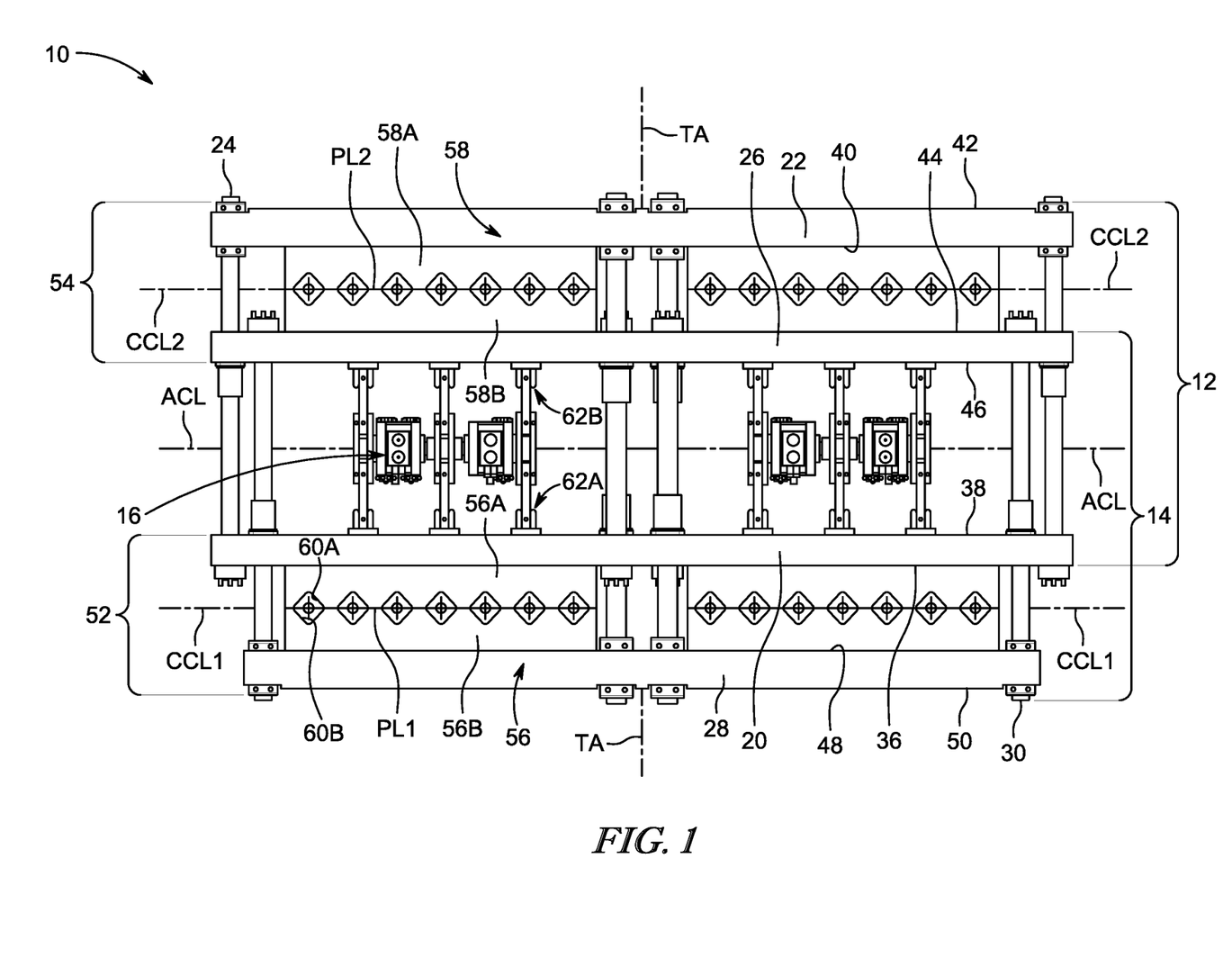
FIG. 1 is a top view of a mold clamping apparatus in accordance with an embodiment of the present disclosure in a closed configuration.
Figure 2:
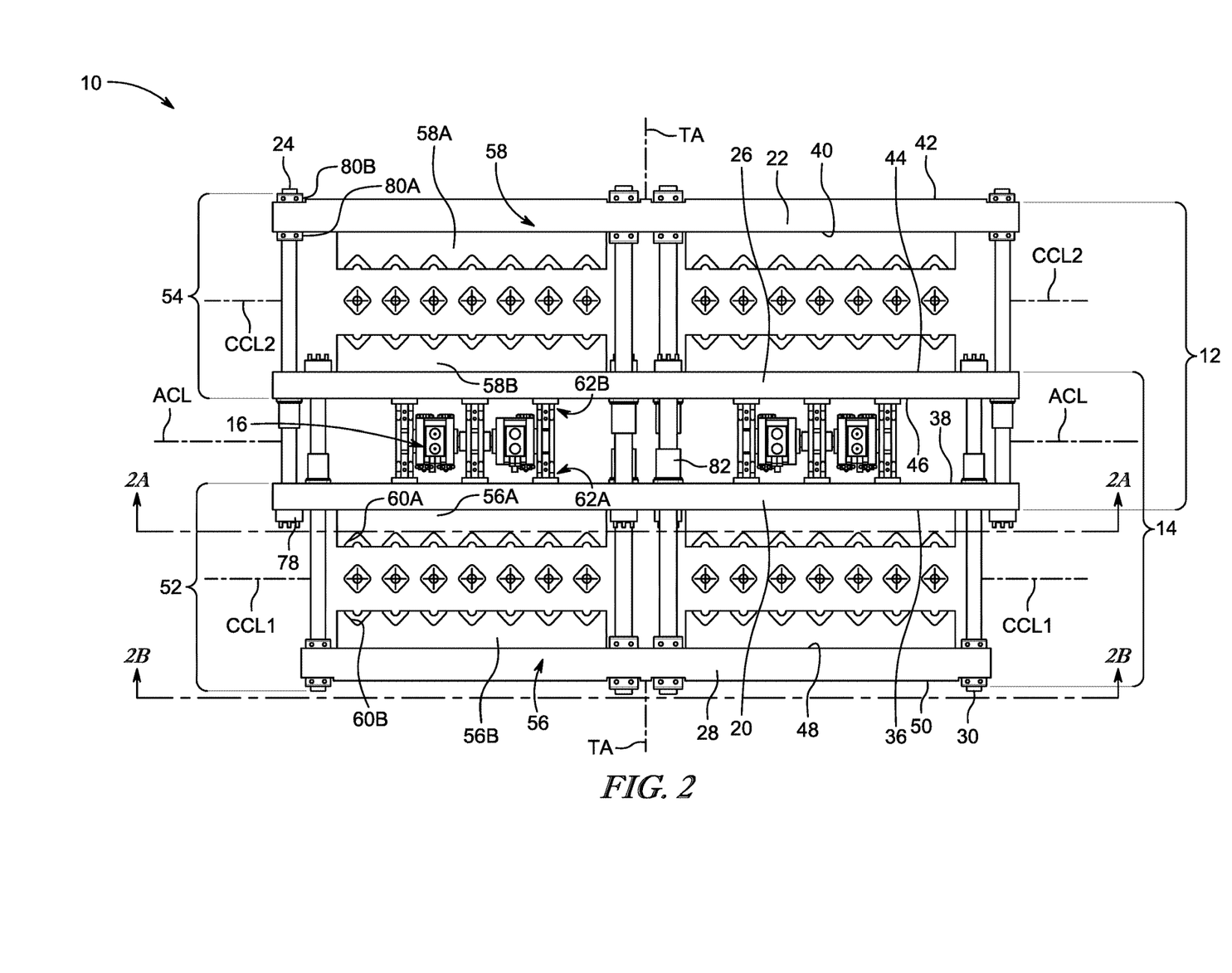
FIG. 2 is a top view of the mold clamping in an open configuration.
Figure 2A:
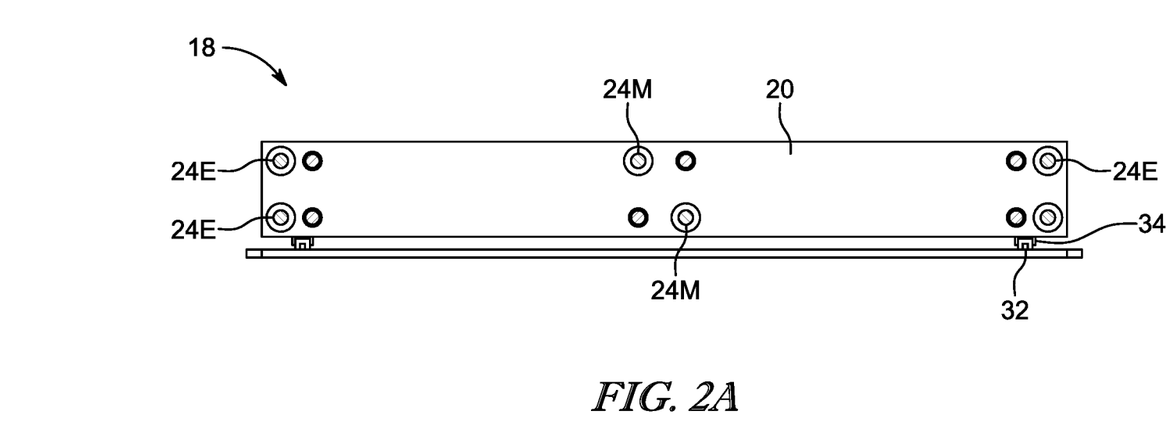
FIG. 2A of a portion of FIG. 2 as viewed from line A-A.
Figure 2B:
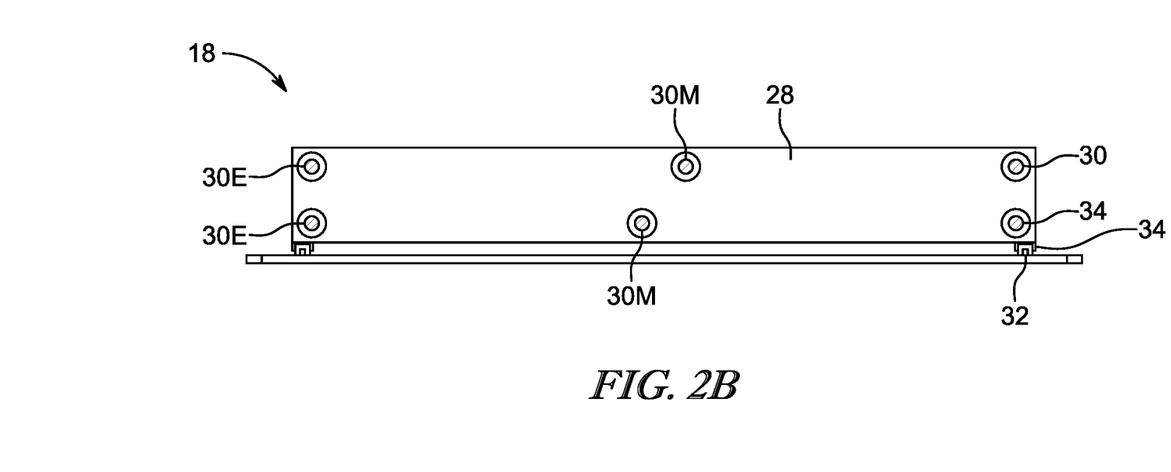
FIG. 2B of a portion of FIG. 2 as viewed from line B-B.
Figure 3:
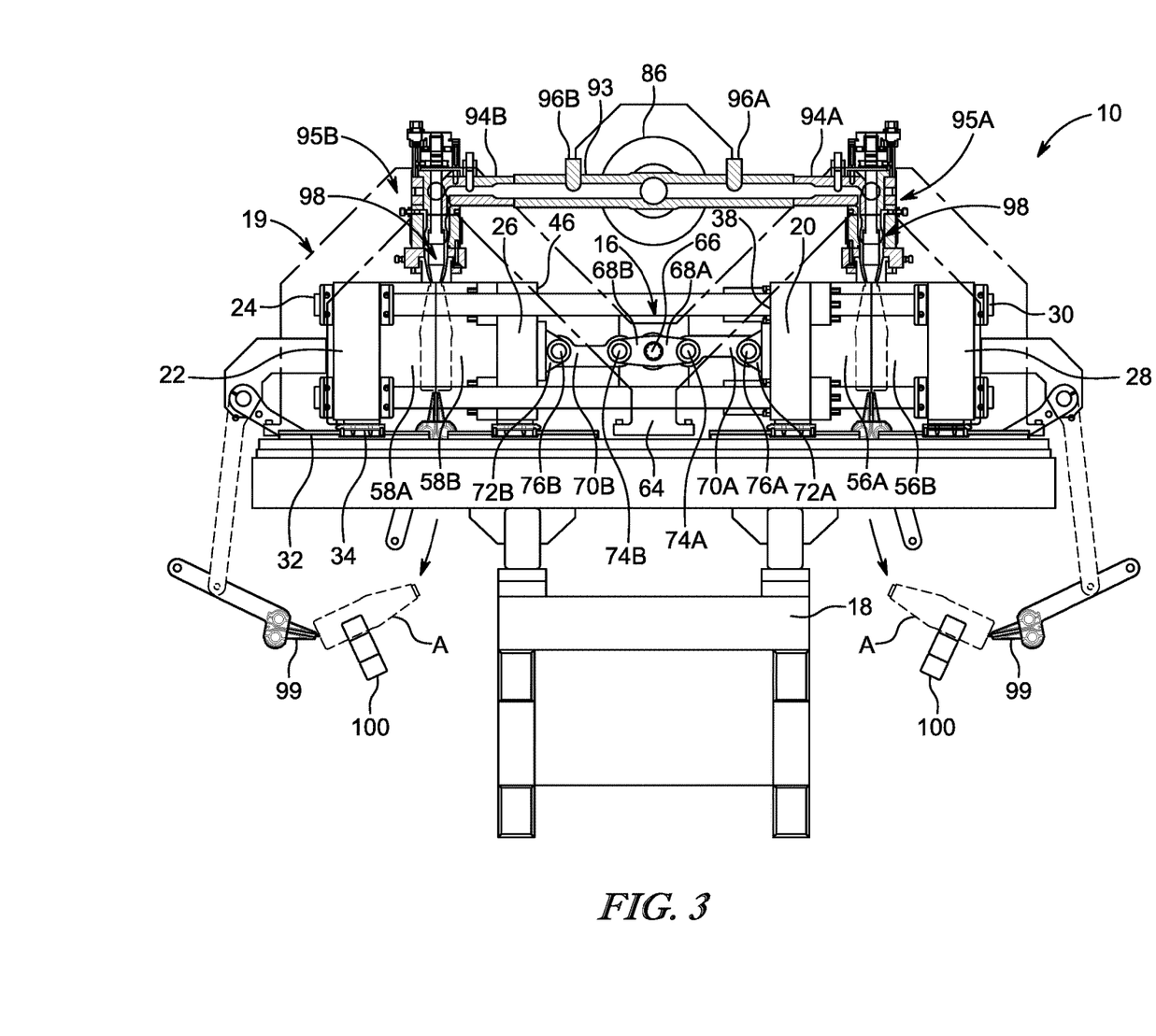
FIG. 3 is a side view of the mold clamping apparatus in the closed configuration.
Figure 4:
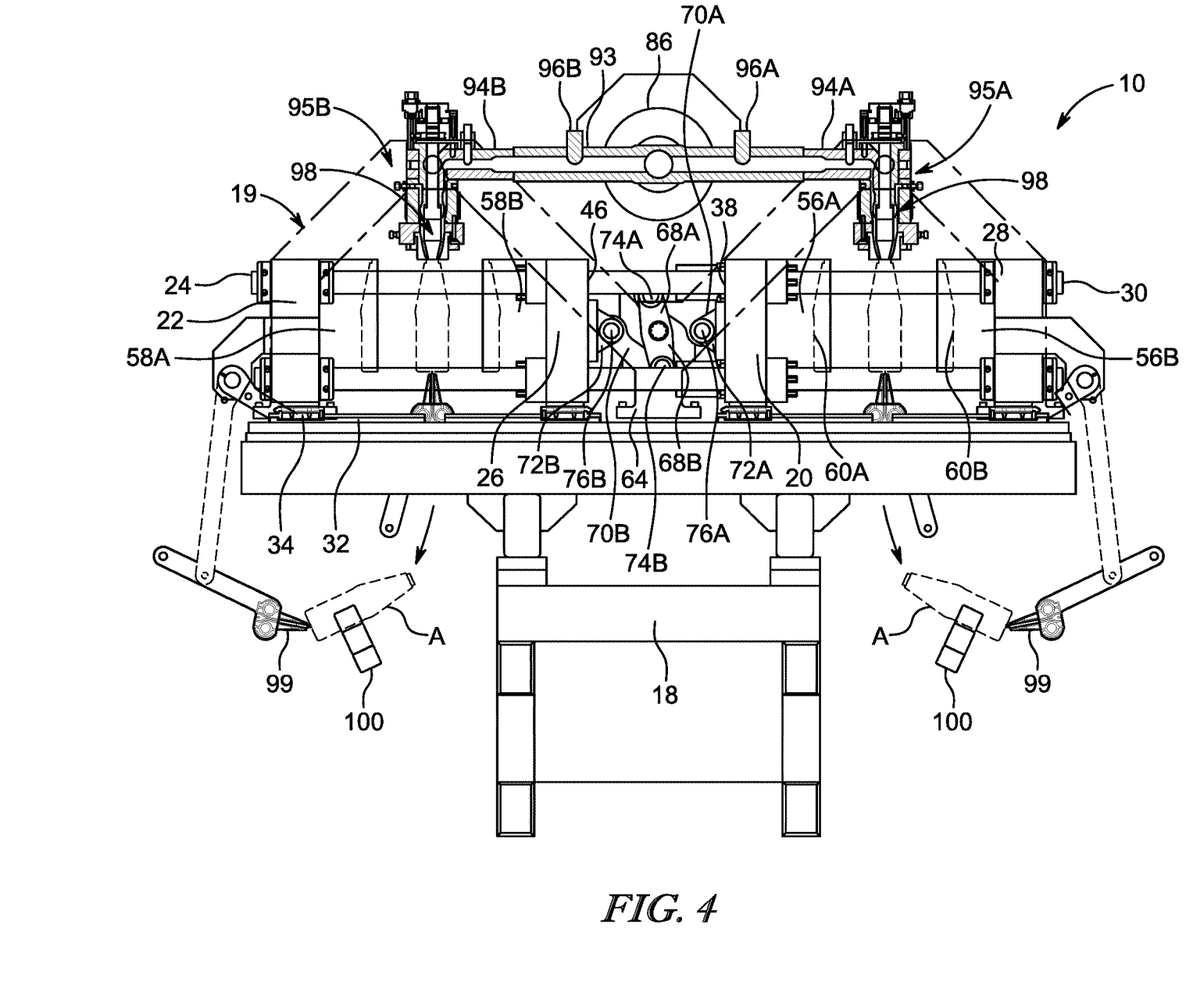
FIG. 4 is a side view of the mold clamping apparatus in the open configuration.

Referring to FIGS. 1-4, in which FIGS. 1 and 2 are top views of a mold clamping apparatus 10 in accordance with an embodiment of the present disclosure, and FIG. 2A of a portion of FIG. 2 as viewed from line A-A, and FIG. 2B of a portion of FIG. 2 as viewed from line B-B. FIGS. 3 and 4 are side or elevation views of the mold clamping apparatus 10. As shown in FIGS. 1 and 3, the mold clamping apparatus 10 is in a closed configuration, and as shown in FIGS. 2 and 4, the mold clamping apparatus 10 is in an open configuration.

Mold clamping apparatus 10, which can also be referred to as clamping apparatus 10, includes a first platen assembly 12, a second platen assembly 14, an actuator assembly or actuator 16 for translating the clamping apparatus 10 between its open and closed configurations, and a base or frame 18 to which the platen assemblies 12, 14 and the actuator assembly 16 are coupled. A clamping apparatus centerline or center plane ACL extends axially through the midpoint of the actuator assembly 16.

The first platen assembly 12 includes a first inner platen 20 and a first outer platen 22 which is spaced apart from the first inner platen 20 by a first set of tie bars 24 (shown shaded in FIGS. 1, 2, 2A, 2B) that couple the first inner platen 20 together with the first outer platen 22 such that movement of the first inner platen 20, for example, up and down as shown on the page view, causes the first outer platen 22 to move in unison with the first inner platen 20. Similarly, the second platen assembly 14 includes a second inner platen 26 and a second outer platen 28 which is spaced apart from the second inner platen 26 by a second set of tie bars 30 (shown hatched in FIGS. 1, 2, 2A, 2B) that couple the second inner platen 26 together with the second outer platen 28 such that movement of the second inner platen 26, for example, up and down as shown on page view, causes the second outer platen 28 to move in unison with the second inner platen 26.

The platen assemblies 12, 14 are slidably coupled to the frame 18 so as to be to be linearly translatable in a guided manner along a translation axis TA which is perpendicular to the clamping apparatus centerline ACL. As shown in FIGS. 3 and 4, the frame 18 includes a bridge 19 which will be discussed further below. Although configurable in a variety of ways, as shown, each of the platens 20, 22, 26, 28 is coupled to the frame 18 by respective linear motion slides which are positioned near or adjacent to the longitudinal ends of the platens 20, 22, 26, 28. The linear motion slides include guide rails 32 that are attached to the frame 18, and aligned with the translation axis TA, and slide blocks 34 that are attached to the platens 20, 22, 26, 28 and slidably mated with the guide rails 32.

Referring now to FIGS. 1, 2, 2A, and 2B, the first inner platen 20 includes a first inner mounting side 36 and a first proximal side 38, and the first outer platen 22 includes a first outer mounting side 40 and a first distal side 42. The second inner platen 26 includes a second inner mounting side 44 and a second proximal side 46, and the second outer platen 28 includes a second outer mounting side 48 and a second distal side 50. As used herein, the terms 'proximal' and 'distal' are used with reference to the clamping apparatus centerline ACL. The first inner mounting side 36, the second inner mounting side 44, the first outer mounting side 40, and the second outer mounting side 48 can be described as vertically oriented planar surfaces, or generally vertically oriented and generally planer surfaces of the platens 20, 22, 26, 28 which are parallel, or generally parallel to each other. Although not shown, mounting sides 36, 44, 40, 48 respectively include mold mounting or securing features (not shown) for attaching, or assisting to attach, respective halves of a split mold thereto.

The first platen assembly 12 is positioned such that the first inner platen 20 and the first outer platen 22 are on opposite sides of the clamping apparatus centerline ACL. Similarly, the second platen assembly 14 is positioned such that the second inner platen 26 and the second outer platen 28 are also on opposite sides of the clamping apparatus centerline ACL.

The first and second platen assemblies 12, 14 are positioned relative to each other such that the first inner platen 20 is located between the second inner platen 26 and the second outer platen 28 and is on the bottom side (as shown in the page view) of the clamping apparatus centerline ACL, and the second inner platen 26 is located between the first inner platen 20 and the first outer platen 22 and is on the top side (as shown in the page view) of the clamping apparatus centerline ACL.

The first inner platen 20 and the second outer platen 28 in part define a first mold clamp 52 in which the first inner mounting side 36 of the first inner platen 20 and the second outer mounting side 48 of the second outer platen 28 oppose, or face towards each other as the clamp/mounting/pressing faces of the first mold clamp 52. The first mold clamp 52 defines a first mold clamp centerline or center plane CCL1, which is parallel to the clamping apparatus centerline ACL, and is equispaced between the first inner mounting side 36 of the first inner platen 20 and the second outer mounting side 48 of the second outer platen 28.

The second inner platen 26 and the first outer platen 22 in part define a second mold clamp 54, in which the second inner mounting side 44 of the second inner platen 26 and first outer mounting side 40 of the first outer platen 22 oppose, or face towards each other as the clamp/mounting/ pressing faces of the second mold clamp 54. The second mold clamp defines a second mold clamp centerline or center plane CCL2, which is parallel to the clamping apparatus centerline ACL, and is equispaced between the second inner mounting side 44 of the second inner platen 26 and first outer mounting side 40 of the first outer platen 22.

According to this arrangement the mold clamping apparatus 10 includes two mold clamps: i.e. a first mold clamp 52 having a first mold clamp centerline CCL1 which is located on one side of the clamping apparatus centerline ACL, and a second mold clamp 54 having a second mold clamp centerline CCL2 which is located on the opposite side of the clamping apparatus centerline ACL as is the first mold clamp 52.

In operation, a first split mold 56 is mounted in the first mold clamp 52 and a second split mold 58 is mounted in the second mold clamp 54. The first split mold 56 includes a first "A" half 56A which is attached to the first inner mounting side 36 of the first inner platen 20 and a first "B" half 56B which is attached to the second outer mounting side 48 of the second outer platen 28. The second split mold 58 includes a second "A" half 58A which is attached to the first outer mounting side 40 of the first outer platen 22 and a second "B" side 58B which is attached to the second inner mounting side 44 of the second inner platen 26. The split molds 56, 58, are sized such that when the clamp assembly 10 is in a closed configuration, a first parting line PL1, between contacting first split mold halves 56A, 56B, is aligned with the first mold clamp centerline CCL1, and a second parting line PL2, between contacting second split mold halves 58A, 58B, is aligned with the second mold clamp centerline CCL2.

A recess is formed within the parting faces of the split mold halves 56A, 56B, 58A, 58B, such as, recesses 60A and 60B called out on the first split mold 56. The recesses 60A, 60B are shaped to form a cavity that defines the outer surface of a blow molded article when an extruded parison is inflated and cooled within the split molds 56, 58. By way of example and not limitation, as shown, split molds 56, 58 include seven cavities.

In operation, the actuator 16 simultaneously opens and closes the first and second mold clamps 52, 54 which opens and closes the first and second split molds 56, 58. The actuator 16 includes a first working end 62A which is connected to the first inner platen 20 and a second working end 62B which is connected to the second inner platen 26. By way of example and not limitation the first working end 62A is connected to the first proximal side 38 of the first inner platen 20, and the second working end 62B is connected to the second proximal side 46 of the second inner platen 26. The actuator 16 is translatable between a retracted configuration (as shown in FIGS. 1 and 3) and an extended configuration (as shown in FIGS. 2 and 4). When the actuator 16 is translated, the first and second working ends 62A, 62B simultaneously move towards or away from each other, and the first and second molds clamps 52, 54 are connected together in synchronous manner so that translation of the actuator 16 causes the first and second mold clamps 52, 54 to open and close at the same time. Such synchronized movement of the first and second mold clamps 52, 54 can be accomplished in a variety of ways, including, for example, a linear actuator and a rack and pinion connection between the first and second inner platens 20, 26, or by a crank and connecting arm between the first and second inner platens 20 as will be described in further detail below.

As the actuator 16 is translated to its retracted configuration the first and second inner platens 20, 26 are simultaneously pulled towards each other, or closer to the clamping apparatus centerline ACL which moves the first inner mounting side 36 away from the first mold clamp centerline CCL1 (upward as shown on the page view), and, at the same time moves the second inner mounting side 44 away from the second mold clamp centerline CCL2, (downward as shown on the page view).

With the first inner platen 20 and the first outer platen 22 being located on opposite sides of the clamping apparatus centerline ACL, and being connected together to move as a single unit, as the first inner platen 20 is being pulled upward (as shown on the page view) towards the clamping apparatus centerline ACL and away from the first mold clamp center line CCL1, the first outer platen 22 is concurrently being pushed upward (as shown on the page view), via the tie bars 24 connecting the first outer platen 22 to the first inner platen 20) away from the clamping apparatus centerline ACL and the second mold clamp centerline CCL2 to separate the first outer mounting side 40 from the second inner mounting side 44 thereby separating or opening the second mold clamp 54 and the second split mold 58 that is mounted therein.

Similarly, with the second inner platen 26 and the second outer platen 28 also being located on opposite sides of the clamping apparatus centerline ACL, and connected together to move as a single unit as the second inner platen 26 is being pulled (downward as shown on the page view of FIG. 1) towards the clamping apparatus centerline ACL and away from the second mold clamp center line CCL2, the second outer platen 28 is concurrently being pushed downward (as shown on the page view) via the tie bars 30 connecting the second outer platen 28 to the second inner platen 26, away from the clamping apparatus centerline ACL and the first mold clamp centerline CCL1 to separate the second outer mounting side 48 from the first inner mounting side 36 thereby separating or opening the first mold clamp 52 and the first split mold 56 that is mounted therein.

The actuator 16 is connected to the frame 18 such that whether it is in its retracted or its extended configuration, the first and second inner mounting sides 36, 44 and the first and second outer mounting sides of the first and second inner platens 20, 26 are equidistant from their respective mold clamp centerlines CCL1, CCL2. As shown, this is accomplished at least in part by mounting the actuator 16 to the frame 18 such that its mid-point is aligned with the clamping apparatus centerline ACL.

Referring now to FIGS. 3 and 4, while various actuator assemblies are contemplated, as shown by way of example and not limitation, as shown the actuator 16 is a so-called rotary actuator or "Rotac" which includes a body 64, a drive shaft 66 a crank 68 a pair of connecting bars 70, i.e., a first connecting bar 70A and a second connecting bar 70B, and a pair of clevis' 72, i.e. a first clevis 72A and a second clevis 72B, which are respectively attached to the first proximal side 38 of first inner platen 20 and the second proximal side 46 of the second inner platen 26. The actuator assembly 16 is affixed to the frame 18 by the body 64 portion thereof. The drive shaft 66 projects from the body 64 along an axis that is parallel to the clamping apparatus centerline ACL, and the crank 68 is attached to the drive shaft 66 by, for example, a spline connection therebetween, so as to be drivable therewith. A drive source, for example, a hydraulically powered drive source, or an electrically powered drive source such as an electric motor is operably connected to the drive shaft 66 either directly or via a transmission or reduction unit. The crank 68 includes first and second arm portions 68A, 68B which are arranged in rotational symmetry at 180 degrees with respect to the drive shaft 66. The first and second connecting bars 70A, 70B are respectively rotatably connected to the distal ends of the first and second crank arm portions 68A, 68B through proximal connecting pins 74A, 74B, and the first and second clevis' 72A 72B are respectively rotatably connected to the distal ends of the first and second connecting bars 70A, 70B through distal connecting pins 76A, 76B. Owing to this arrangement, the actuator 16 is selectively actuated between two terminal positions by driving the drive source. More specifically, in response to powering the power source, the drive shaft 66 is selectively drivable in either the clockwise or counter clockwise direction (as shown on page views of FIGS. 3 and 4) through a pivot angle which is slightly greater than 90 degrees. As shown in FIG. 3, the drive shaft 66 is positioned such that the crank 68 and the connecting bars 70A, 70B are aligned, and the clamping apparatus is in its closed configuration, in which the first and second mold halves 56A, 56B, 58A, 58B of the first and second molds 56, 58 are brought into contact with each other to generate a prescribed clamping force therebetween which is suitable for inflating an extruded parison therein. As shown in FIG. 4, the drive shaft 66 and crank 68 attached thereto have be rotated in the counter clockwise direction slightly more than 90 degrees compared to their angular orientation shown in FIG. 3 such that the crank arm portions 68A, 68B and the connecting bars 70A, 70B are misaligned with each other in a rotationally symmetric manner relative to the drive shaft axis, and the clamping apparatus 10 is in its open configuration, in which the first and second mold halves 56A, 56B, 58A, 58B of the first and second molds 56, 58 are separated from each other to permit introduction of a newly extruded parison therebetween, or removal of a newly molded article therefrom.

Referring now to FIGS. 1 and 2, the first set of tie bars 24 is attached to the first platen assembly 12 so as to permit an amount of lateral displacement of at least one of the first inner platen 20 and the first outer platen 22 relative to their respective mold clamp centerlines CCL1, CCL2. Likewise, the second set of tie bars 30 is attached to the second platen assembly 14 so as to permit an amount of lateral displacement of at least one of the second inner platen 26 and the second outer platen 28 relative to their respective mold clamp centerlines CCL2, CCL1. Lateral displacement of at least one of the first inner platen 20 and the first outer platen 22 relative to their respective mold clamp centerlines CCL1, CCL2 may be required, for example, to accommodate for a variation in the stack heights of the split molds 56, 58 if, for example, the thickness of a half of one of the split molds 56, 58 is reduced while being altered or repaired. With reference to the first platen assembly 12, each of the first set of tie bars 24 is axially fixed relative to first inner platen 20, whereas the lateral position of the first outer platen 22 can be adjusted relative to the second mold clamp centerline CCL2. While configurable in a variety of ways, as shown in FIGS. 1 and 2, the proximal end of each first tie bar 24 extends through the first inner platen 20 and is rigidly secured to a fixed nut 78, which itself is rigidly secured to the first inner platen 20 by, for example, a plurality of socket head cap screws, thus axially fixing the axial position of the first tie bar 24 relative to the first inner platen 20. The distal end of each first tie bar 24 is threaded, and extends through the first outer platen 22 to threadably mate with a pair of locking or adjustment nuts 80A, 80B, one of which is located on either side of the first outer platen 22. The inner one of the pair of adjustment nuts 80A provides an inner abutment against which the first outer mounting side 40 of the first outer platen 22 is held, and the outer one of the pair of the mounting nuts 80B provides an outer abutment which bears against the first distal side 42 of the first outer platen 22 when the outer one of the pair of the adjustment nuts 80B is tightened against the first outer platen 22. The length of the first tie bar 24 is such that it extends through the first outer platen 22 and beyond the outer one of the pair of adjustment nuts 80B to facilitate outward later adjustment of the first outer platen 22. Tightening the outer one of the pair of the adjustment nuts 80B against the first outer platen 22 secures the first outer platen 22 against the inner adjustment nut 80A to set the spacing between the first outer mounting side 40 and the second inner mounting side 44.

Continuing with FIGS. 1 and 2, and also referring to FIGS. 2A and 2B, while a specific number and arrangement of tie bars is shown, other number and arrangements of tie bars are contemplated for the mold clamping apparatus 10. However, generally speaking the number and arrangement of the first and second sets of tie bars 24, 30 is such that, in operation, clamping force is evenly, or generally evenly distributed between the first inner platen 20 and the second outer platen 28, and between the second inner platen 26 and the first outer platen 22, or along the opposing clamping faces of the first and second mold clamps 52, 54.

As shown, the first set of tie bars 24, or more generally, the first platen assembly 12 includes six first tie bars 24. Similarly, the second set of tie bars 30, or more generally, the second platen assembly 14 also includes six second tie bars 30. The first set of tie bars 24 includes two vertically aligned pairs of first tie bars 24E that pass through second inner platen 26, and are connected to the first inner platen 20 and the first outer platen 22 near the respective ends of the first inner platen 20 and the first outer platen 22. The first and second inner platens 20, 26 and the first outer platen 22 are shown as being longer than the second outer platen 28 by way of example and not limitation. In an embodiment (not shown) the platens 20, 22, 26, 28 are the same length.

In addition to the two vertically aligned pairs of first tie bars 24E, the first set of tie bars 24 further includes a diagonally offset pair of first tie bars 24M that pass through the second inner platen 26 and are connected to the first inner platen 20 and the first outer platen 22. The diagonally offset pair of first tie bars 24M are located midway along the respective lengths of the first inner platen 20, the second inner platen 26, and the first outer platen 22, with one of the diagonally offset pair of first tie bars 24M being located on either side of the respective midlines, shown at TA, of each platen 20, 26, 22.

The second set of tie bars 30 includes two vertically aligned pairs of second tie bars 30E that pass through first inner platen 20, and are connected to the second inner platen 26 and the second outer platen 28 near the respective ends of the second inner platen 26 and the second outer platen 28. In addition to the two vertically aligned pairs of second tie bars 30E, the second set of tie bars 30 further includes a diagonally offset pair of second tie bars 30M (diagonally offset in the opposite direction as the diagonally offset pair of first tie bars 24M) that also pass through the first inner platen 20, and are connected to the second inner platen 26 and the second outer platen 28. The diagonally aligned pair of second tie bars 30M are located midway along the respective lengths of the second inner platen 26, the first inner platen 20, and the second outer platen 28, with one of the diagonally aligned pair of second tie bars 30M being located on either side of the respective midlines, shown at TA of each platen 26, 20, 28.

At each location where a tie bar 24, 30 passes through a platen 20, 26, and is not connected thereto, a bushing can optionally be provided therebetween, such as, for example the bushing 82 coupled to the first inner platen 20, through which a respective one of the second tie bars 30 passes. Such bushings can help to reduce wear and improve guidance between the first and second platen assemblies 12, 14, as the mold clamping apparatus 10 is translated between open and closed configurations.

Figure 5:
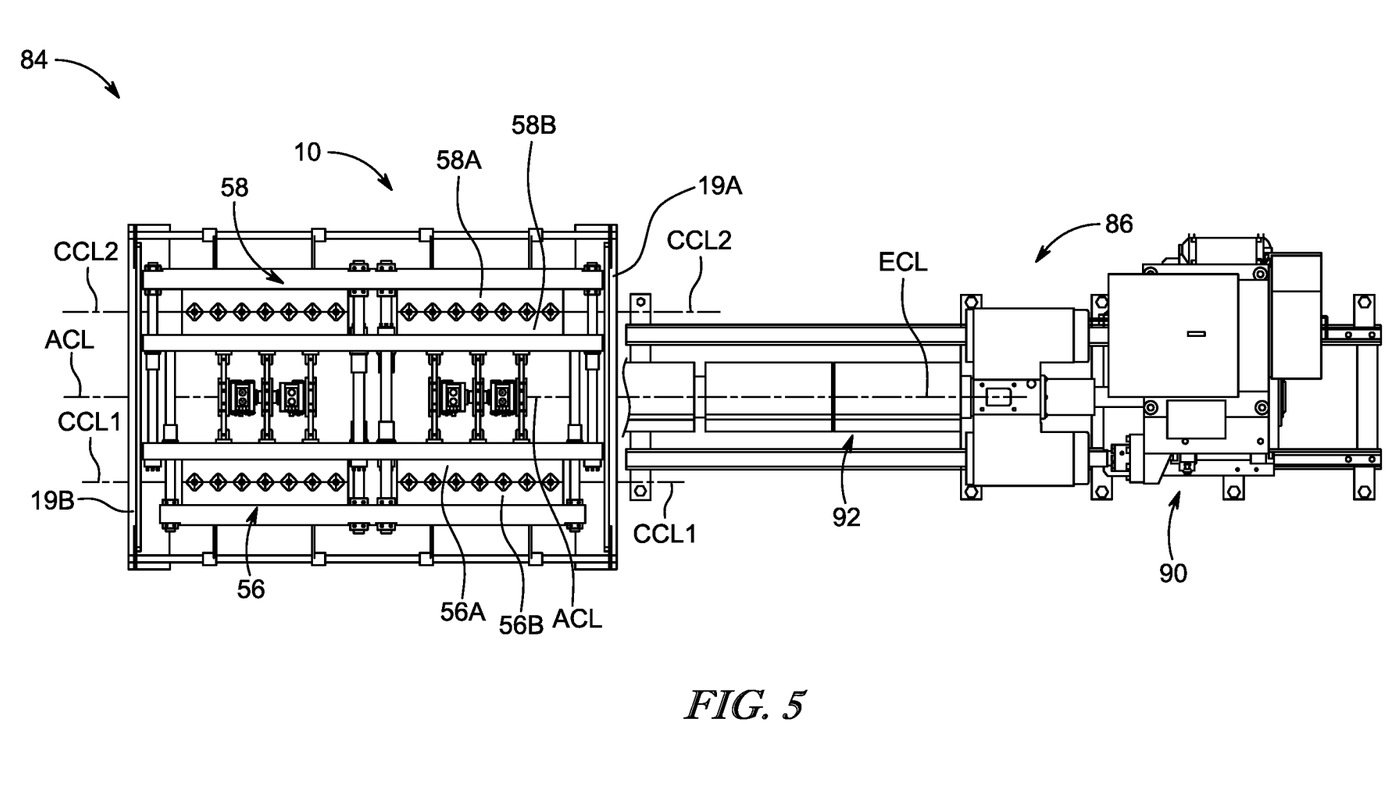
FIG. 5 is a top view of a blow molding system in accordance with an embodiment of the present disclosure.
Figure 6:
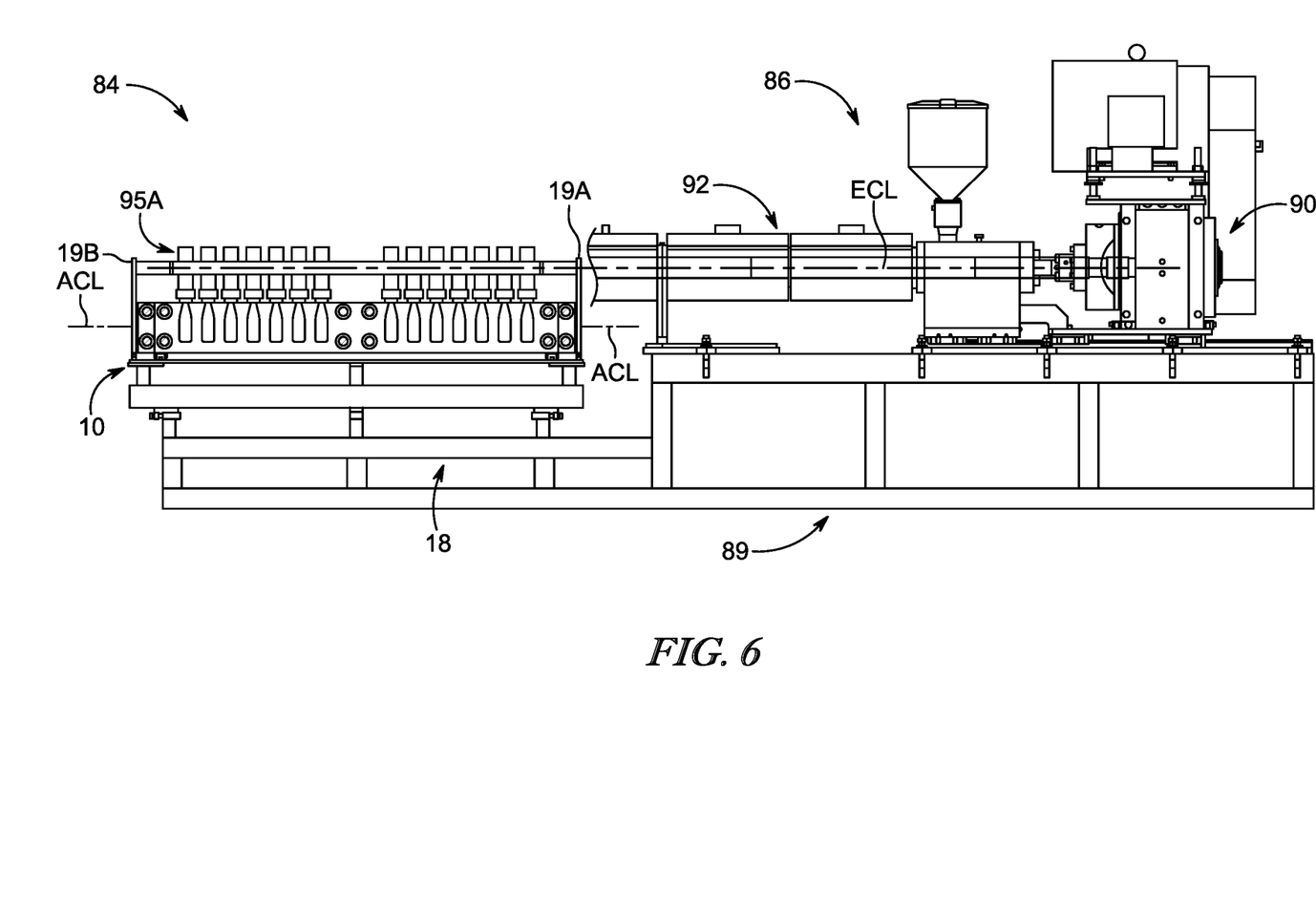
FIG. 6 is an elevation view of the blow molding system.
Figure 7:
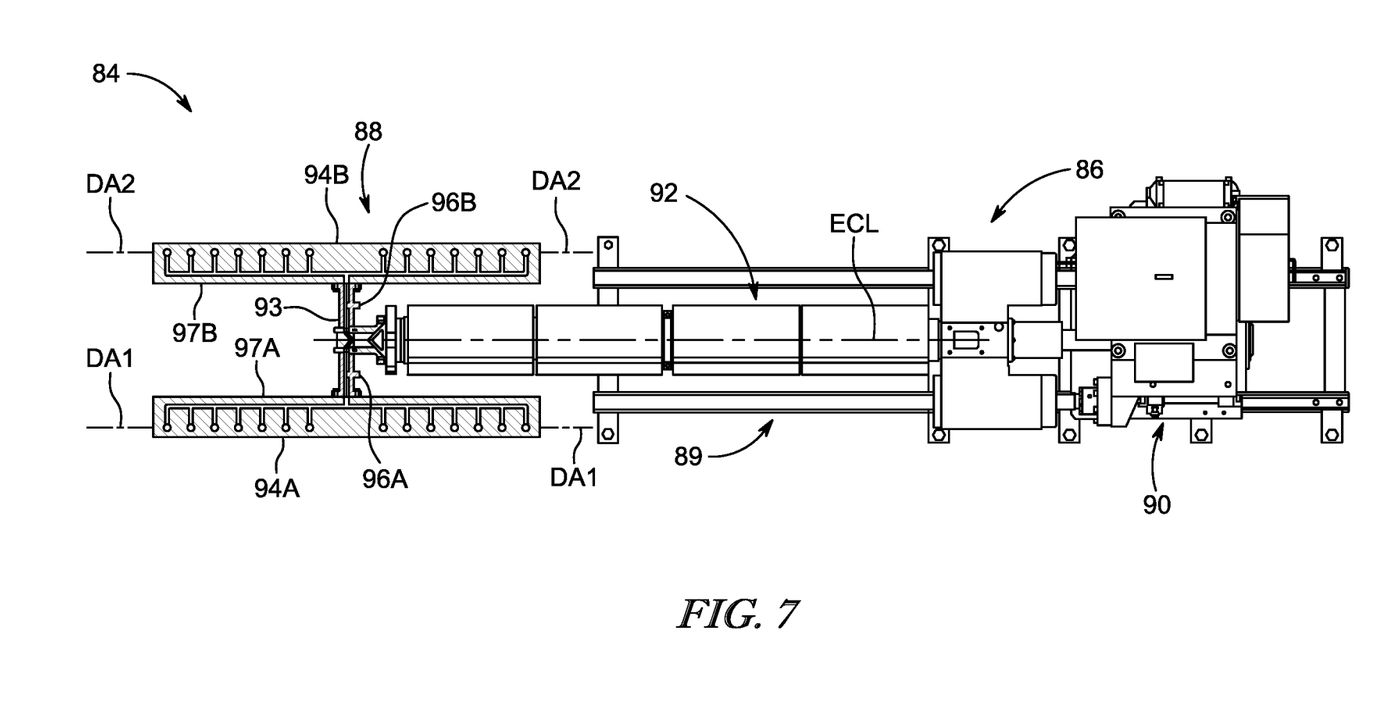
FIG. 7 is a top view of an extruder, and a sectional view of a melt distribution system of the blow molding system.

Referring now to FIGS. 3 and 4, and also to FIGS. 5-7, in which FIG. 5 is a top view of a blow molding system 84 in accordance with an embodiment of the present disclosure, showing the orientation of the mold clamping apparatus 10 relative to an extruder 86 of the blow molding system 84, FIG. 6 is an elevation view of the blow molding system, and FIG. 7 is a top view of the extruder 86 and a sectional view of a distribution system 88 of the blow molding system, and It should be appreciated that in FIG. 5, a portion of the extruder 86 is not shown for ease of viewing the mold clamping apparatus 10, and in FIG. 7, the mold clamping apparatus 10 is not shown for ease of viewing the distribution system 88.

Blow molding system 84 includes the extruder 86, the distribution assembly 88, and the clamp assembly 10. The clamping assembly 10 is positioned relative to the extruder 86 such that a center line ECL of the extruder 86 extends along the clamping apparatus center plane ACL. As can be seen when viewing FIGS. 5 and 7, the clamp assembly 10 is at least partially overlapped by the downstream end of the extruder 86. The extruder 86 is mounted on a frame 89, and includes a drive assembly 90 and a plasticizing assembly 92. The frame 89 can be the same framework as the frame 18 of the clamping apparatus 10, or can be a separate framework that is located beside the frame 18 of the clamping apparatus 10. The extruder centerline ECL extends axially through the plasticizing assembly 92. In operation, raw polymeric or other moldable material is introduced plasticizing assembly 92. As it is moved through the extruder 86, the raw material is transformed molten moldable material a combination heat input and friction. Once a suitable volume of molten material is accumulated at the downstream end of the extruder, it is then passed into the distribution system 88. By way of example and not limitation, the extruder 86 is of the intermittent reciprocating screw variety The distribution system 88 is coupled to the frame 18 of the clamping apparatus 10 via the bridge 19. The distribution assembly 88 can be generally be described as having an "H" shape (when viewed from above) and is located above the clamping assembly 10. The distribution assembly includes a junction 93, a pair of manifolds, i.e., a first manifold 94A and a second manifold 94B, and a plurality of die heads 95, i.e. a first set of die heads 95A, and a second set of die heads 95B (shown in FIGS. 3 and 4). The bridge 19 includes a pair of bridges, i.e. a first bridge 19A and a second bridge 19B. Each manifold 94A, 94B and its respective die heads 95A, 95B are supported above a respective split mold 56, 58 by the first bridge 19A and the second bridge 19B. As shown in FIGS. 3 and 4 the bridge 19 can generally be described as having an "M" shape. The number and pitch spacing of the die heads 95A, 95B is equal to the number and pitch spacing of mold cavities defined by the split molds 56, 58 mounted in the clamping apparatus 10. The first set of die heads 95A is aligned along a first drop centerline or center plane DA1 which is aligned with the first mold clamp centerline CCL1, and the second set of die heads 95B is aligned along a second drop centerline or center plane DA2 which is aligned with the second mold clamp centerline CCL2.

The junction 93 divides the molten material between the first manifold 94A and the second manifold 94B, and includes a pair of distribution valves or chokes 96A, 96B for influencing the proportional divide of molten material between the first manifold 94A and the second manifold 94B. Each manifold 94A, 94B includes a channel 97A, 97B that receives the molten material from the junction 93 and divides the incoming flow of molten material between the pluralities of die heads 95A, 95B. Each die head 95A, 95B includes a die and mandrel die, shown at 98 which reshapes the solid, incoming flow of molding material, into a vertically oriented tubular shaped parisons which are extruded downward from the die heads 95A, 95B into the space between the respective halves 56A, 56B, 58A, 58B of the split molds 56, 58, which are separated by the mold clamps 52, 54 in which they are mounted. Ideally, in operation, the first drop centerline DA1 and the first clamp centerline CCL1 are coplanar, likewise the second drop centerline DA2 and the second clamp centerline CCL2 are coplanar such that when the first and second split molds 56, 59 are open, the respective parting faces of the first and second split mold halves 56A, 56B, 58A, 58B are equidistant from the parisons that are extruded from the first and second die heads 95A, 95B. Once the parison is extruded to a suitable length, the clamping assembly 10 is moved to its closed configuration which thereby closes the first and second mold clamps 52, 54, and pinches the extruded parisons within the respective cavities of the closed molds 56, 58, where they are inflated or blown by pressurized air, from the die heads, into contact with the walls of the mold cavities, the shape of which conforms to that of a finished molded article. Once the newly molded articles has sufficiently cooled, a bottle takeout assembly coupled to the frame 18, such as takeout 99 shown in FIGS. 3 and 4, can be moved from its out bound position (depicted by dashed lines) to its inbound position (depicted by solid lines) to grip the newly molded article by, for example its so-called "tail-flash", and upon the clamping apparatus being translated to its open configuration, the takeout 99 can be returned to its outbound position to release the newly molded article to a part handling device, such as, for example a paddle conveyor belt 100 as shown in FIG. 3. While the newly molded articles are cooling in the molds 56, 58, the extruder 86 prepares a subsequent mass of molten material which will be passed through the distribution system, and extruded into parisons that will be admitted into the molds 56, 58 when they are opened to release presently formed newly molded articles.

As mentioned above, ideally, in operation, first and second drop centerlines DA1 DA2 are coplanar with the first and second clamp centerlines CCL1, CCL2; however, it should be appreciated that conditions or instances may arise where this is not the case. If, for example, in operation, the first drop centerline DA1 is offset towards the extruder centerline ECL, relative to the first clamp centerline CCL1 by an unacceptable amount, one way to correct this is to position an annular shaped spacer or shim having a suitable thickness between an outlet of the junction 93 and the inlet of the first manifold 94A. This will have the effect of laterally moving the first manifold 94A, and thus the first drop centerline DA1 away moving the extruder centerline ECL, and into alignment with the first clamp centerline CCL1. Conversely, if for example, in operation, the first drop centerline DA1 is offset away from the extruder centerline ECL, relative to the first clamp centerline CCL1 by an unacceptable amount, one way to correct this is to position a spacer or shim having a suitable thickness between each clevis 72A and the first proximal side 38 of the first inner platen 20. This will have the effect of laterally moving the first inner platen 20, the first split mold half 56A mounted thereto, and thus the first clamp centerline CCL1 away from the clamping apparatus centerline ACL and into alignment with first drop centerline DA1.

While various embodiments have been described above, it should be understood that they have been presented only as illustrations and examples of the present invention, and not by way of limitation. It will be apparent to persons skilled in the relevant art that various changes in form and detail can be made therein without departing from the breadth and scope of the invention. Thus, the breadth and scope of the present invention should not be limited by any of the above-described exemplary embodiments but should be defined only in accordance with the appended claims and their equivalents. It will also be understood that each feature of each embodiment discussed herein can be used in combination with the features of any other embodiment.

What is claimed is:

1. A mold clamping apparatus for opening and closing a pair of blow molds, the mold clamping apparatus comprising:
    a first inner platen coupled to a first outer platen so as to be movable therewith;
    a second inner platen coupled to a second outer platen so as to be movable therewith; and
    an actuator coupled between the first inner platen and the second inner platen for opening and closing a first mold clamp defined between opposing sides of the first inner platen and the second outer platen while simultaneously opening and closing a second mold clamp defined between opposing sides of the second inner platen and the first outer platen,
    wherein the actuator includes a body, a drive shaft coupled to the body for rotation about a drive shaft axis that is fixed relative to the body, and a crank coupled with the drive shaft for rotation by the drive shaft about the drive shaft axis to open and close the first mold clamp and the second mold clamp.

2. A blow molding system comprising:
    an extruder having an extruder centerline; and
    a blow mold clamping assembly having a clamping assembly centerline, and a first mold clamp having a first mold clamp centerline located on a one side of the clamping assembly centerline and a second mold clamp having a second mold clamp centerline located on the opposite side of the clamping apparatus centerline, the blow mold clamping assembly positioned relative to the extruder such that the clamping assembly centerline is parallel with the extruder centerline.

3. The mold clamping apparatus of claim 1, wherein the actuator further comprises a first connecting bar that interconnects the crank and the first inner platen, and a second connecting bar that interconnects the crank and the second inner platen on an opposite side of the drive shaft axis from the first connecting bar.

4. The mold clamping apparatus of claim 3, wherein the crank includes first and second arm portions which are arranged in rotational symmetry at 180 degrees with respect to the drive shaft.

5. The mold clamping apparatus of claim 4, wherein the first and second connecting bars are respectively rotatably connected to the distal ends of the first and second crank arm portions through proximal connecting pins.

6. The mold clamping apparatus of claim 5, wherein the actuator further comprises first and second clevis that are respectively rotatably connected to the distal ends of the first and second connecting bars through distal connecting pins.

7. The mold clamping apparatus of claim 6, wherein the distal connecting pins are aligned vertically with the drive shaft axis when the first and second mold clamps are in the closed and opened positions.

8. The mold clamping apparatus of claim 3, wherein the first and second connecting bars are aligned when the first and second mold clamps are closed and the first and second connecting bars are misaligned with each other in a rotationally symmetric manner relative to the drive shaft axis when the first and second mold clamps are in the opened position.

9. The mold clamping apparatus of claim 1, wherein the drive shaft axis is aligned with a clamping apparatus centerline.

10. The blow molding system of claim 2, wherein the first mold clamp centerline and the second mold clamp centerline are each arranged parallel with the clamping assembly centerline.

11. The blow molding system of claim 10, wherein the blow mold clamping assembly further includes an actuator for opening and closing the first mold clamp while simultaneously opening and closing the second mold clamp, and wherein the actuator includes a body arranged to lie in a fixed position relative to the first and second mold clamps, a drive shaft coupled to the body for rotation about a drive shaft axis that is fixed relative to the body, and a crank coupled with the drive shaft for rotation by the drive shaft about the drive shaft axis to open and close the first mold clamp and the second mold clamp.

12. The blow molding system of claim 11, wherein the drive shaft axis is aligned with the clamping apparatus centerline.

13. A blow molding system comprising:
    an extruder having an extruder centerline; and
    a blow mold clamping assembly having a clamping assembly centerline, and a first mold clamp having a first mold clamp centerline located on a one side of the clamping assembly centerline and a second mold clamp having a second mold clamp centerline located on the opposite side of the clamping apparatus centerline, wherein the extruder is positioned entirely above the blow mold clamp assembly.

14. The blow molding system of claim 13, wherein the blow mold clamping assembly further includes an actuator for opening and closing the first mold clamp while simultaneously opening and closing the second mold clamp, and wherein the actuator includes a body, a drive shaft coupled to the body for rotation about an axis that is fixed relative to the body, and a crank coupled with the drive shaft for rotation by the drive shaft about the axis to open and close the first mold clamp and the second mold clamp.

15. The blow molding system of claim 14, wherein the first mold clamp includes a first inner platen and a first outer platen coupled to the first inner platen so as to be movable therewith, the second mold clamp includes a second inner platen and a second outer platen coupled to the second inner platen so as to be movable therewith, and wherein the actuator further comprises a first connecting bar that interconnects the crank and the first inner platen, and a second connecting bar that interconnects the crank and the second inner platen on an opposite side of the drive shaft axis from the first connecting bar.

16. The blow molding system of claim 15, wherein the crank includes first and second arm portions which are arranged in rotational symmetry at 180 degrees with respect to the drive shaft.

17. The blow molding system of claim 16, wherein the first and second connecting bars are respectively rotatably connected to the distal ends of the first and second crank arm portions through proximal connecting pins.

18. The blow molding system of claim 17, wherein the actuator further comprises first and second clevis that are respectively rotatably connected to the distal ends of the first and second connecting bars through distal connecting pins.

19. The blow molding system of claim 18, wherein the distal connecting pins are aligned vertically with the drive shaft axis when the first and second mold clamps are in the closed and opened positions.

20. The blow molding system of claim 14, wherein the drive shaft axis is aligned with the clamping apparatus centerline.

\* \* \* \* \*